Jan. 3, 1928.
J. A. CAMPBELL
1,654,785
ABSORBER
Filed July 30, 1925
2 Sheets-Sheet 1
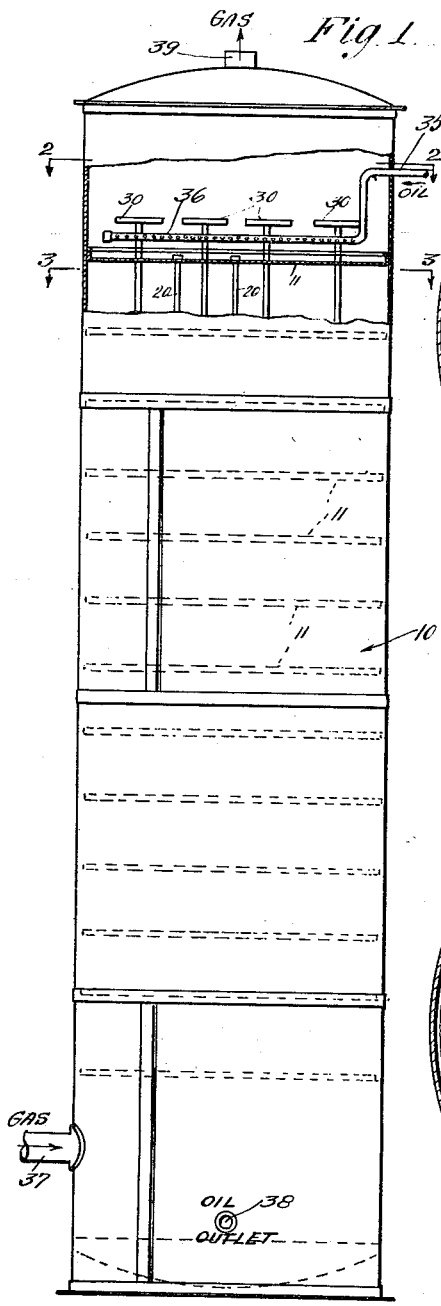
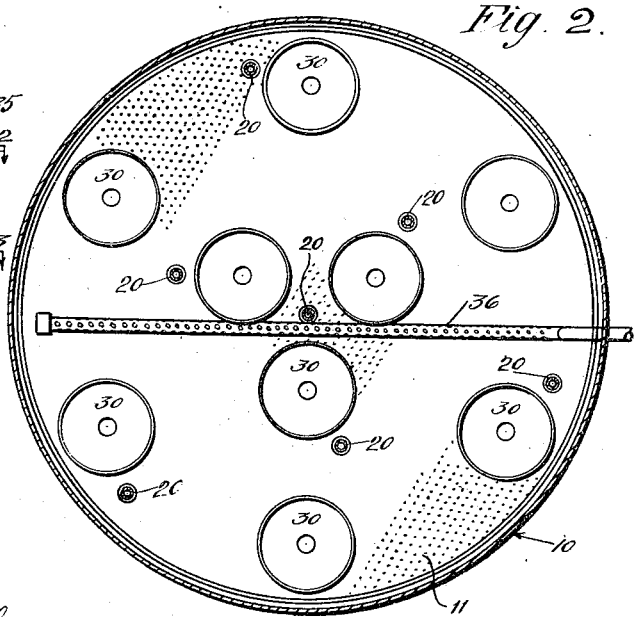
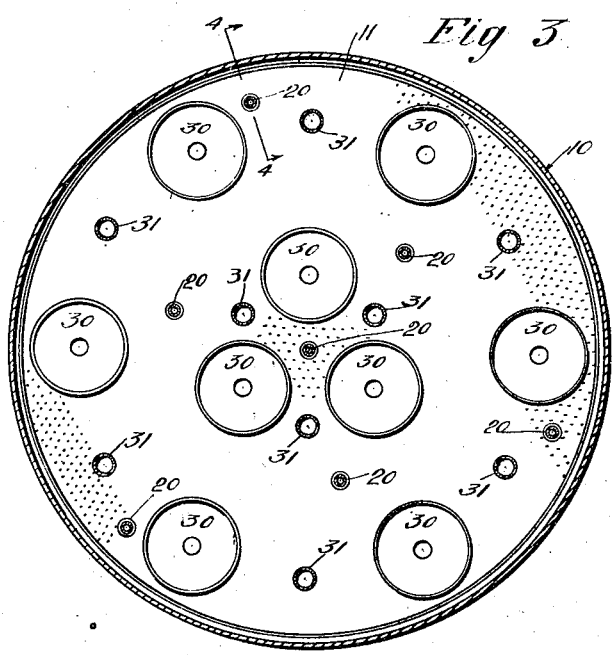
Inventor.
Julian A. Campbell
Attorney.

Jan. 3, 1928.  
J. A. CAMPBELL  
ABSORBER  
Filed July 30, 1925  
1,654,785  
2 Sheets-Sheet 2

Inventor  
Julian A. Campbell

Attorney

Patented Jan. 3, 1928.

1,654,785

UNITED STATES PATENT OFFICE.

JULIAN A. CAMPBELL, OF LONG BEACH, CALIFORNIA.

ABSORBER.

Application filed July 30, 1925. Serial No. 46,974.

This invention has to do with devices of the general character and type that are variously known as absorbers or bubble towers; their function being to intimately distribute and admix the gas or vapor within a liquid, so as to get intimate finely divided contact between the gas and liquid. Sometimes these devices are used for the purpose of absorbing condensible vapors and the gases, as in the case of absorption of gasoline vapors from casing head gas; sometimes these devices are used for the purpose of loading a gas or vapor with substances that they may pick up from the liquid by reason of their intimate contact therewith. Thus although the present device is called an absorber and has been designed more particularly for use as such, and particularly for absorbing the vapors of volatile hydrocarbons such as gasoline from casing head gas and the like, it will be understood that the invention is not thereby limited to such use. A description of the apparatus and its operation specifically as an absorber will make it plain to all those skilled in the art how the device may be used for other purposes.

In devices of the character thus described it is desirable that the several floors over which the liquid is led, and the several overflow edges over which the liquid flows, shall be more or less accurately level so that the action of the device shall be as nearly as possible uniform throughout. Uniformity of action leads to efficiency of results. It is an object of this invention to provide a structure that not only can be easily and quickly fabricated and assembled, but also one in which the several floors and their overflow devices may be easily leveled up. How these and other objects are attained will be made apparent in the following detailed description. In this description I not only describe the structural features of my device, but I also describe the devices and structure that accomplish the intimate admixture of the liquid and gas, but the last merely for the purpose of describing some such device to show the applicability of the present structure to such a device as an absorber, and thereby to clearly bring out the advantages of present structure. However, it will be readily understood that the invention claimed herein is not necessarily limited to use in such a device. In fact the invention which forms the particular subject matter of this application may be applied and used in any situation where it is desirable to support one or a plurality of floors, shells or partitions in a surrounding shell.

The particular devices for causing intimate admixture of a liquid and gases, herein described, are the subject matter of an application divisional of this application, and filed on January 4, 1926, bearing Serial Number 79,073 and entitled "Absorber."

Although the general structure and details hereinafter particularly described are but illustrative and indicative of the invention, I give a detailed and specific description of the preferred and specific form of device shown in the accompanying drawings so that others may have a full understanding of at least one form of the invention, and from that may have a full understanding of the invention itself; it not being intended that the following described details of specific structure and operation shall be limitations upon the invention except as expressly so stated in the claims. For the purpose of such description, I now refer to the accompanying drawings, in which:

Fig. 1 is an exterior elevation, parts being broken away, showing a form of my improved absorber;

Fig. 2 is a horizontal section on line 2—2 of Fig. 1;

Fig. 3 is a horizontal section on line 3—3 of Fig. 1;

Figure 4:
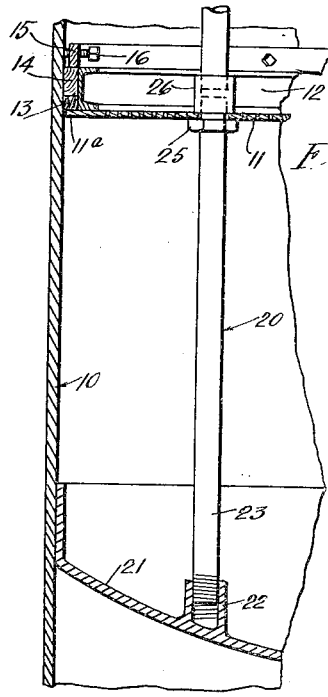
Fig. 4 is an enlarged detail section on line 4—4 of Fig. 3.

The absorber will preferably be housed in the tower-like shell or casing 10, constructed in any suitable manner, preferably of sheet or plate metal; and within this tower there are a number of superimposed perforated floors 11. Each of these floors is formed of a suitable plate perforated with a large number of comparatively small openings. These openings are of such size that gas pressure beneath a floor will prevent flow of liquid through the perforations. At the edge of each floor, attached thereto and forming a sort of rim therefor, is a circular member 12 which may preferably be of channel iron; but the outer face of this rim member 12 is somewhat within the outer edge 11ª of the floor (see Fig. 4) so that the projecting outer edge 11ª may support a suitable packing 13 packed between rim member 12 and shell 10. Over this packing a bent wooden strip 14 is driven down tightly to compress the packing, and then the wooden strip is held in place by a metal ring 15 that fits loosely inside the shell 10 and, being placed on top the wooden strip 14, is held in place by suitable set screws 16.

Figure 6:
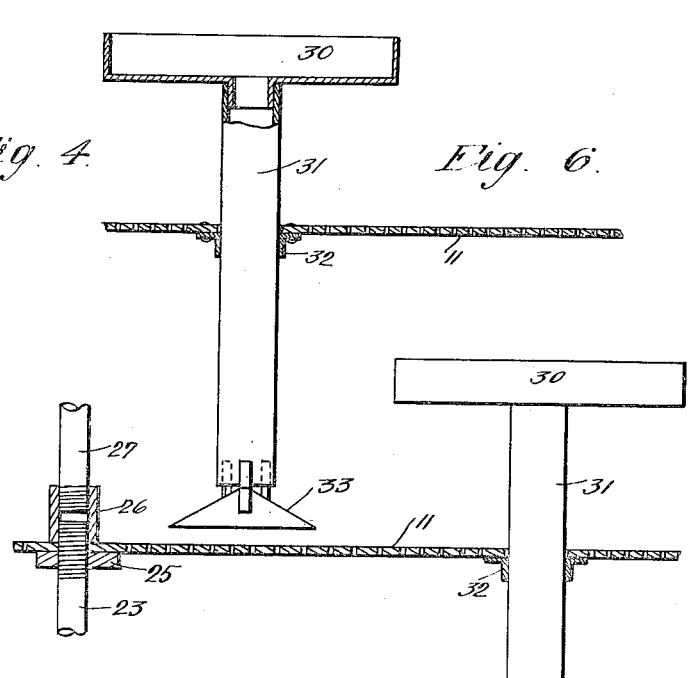
Fig. 6 is an enlargment in detail of certain portions of Fig. 5.
Figure 5:
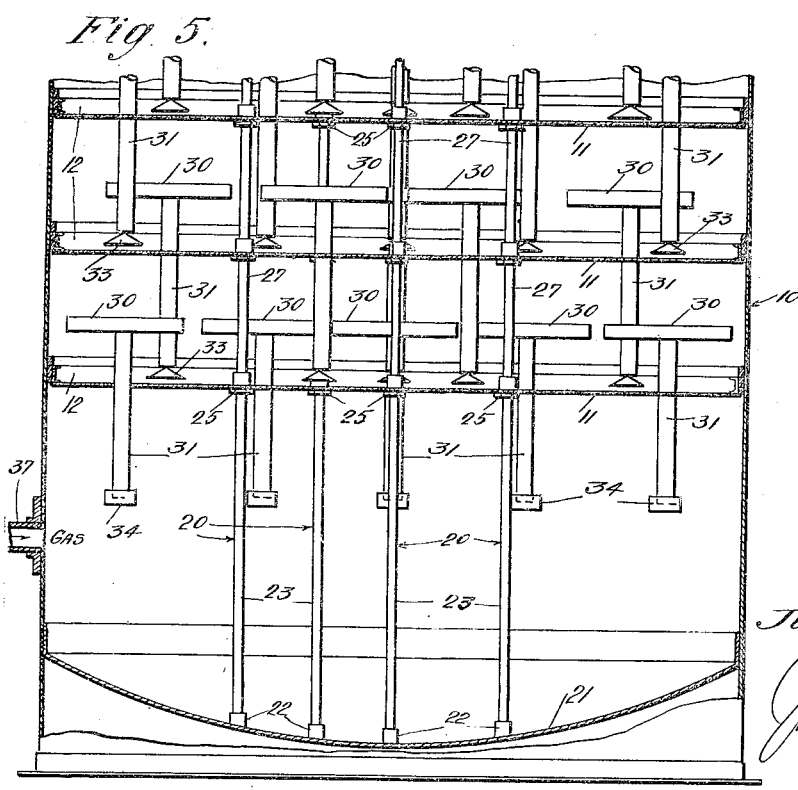
Fig. 5 is a vertical section of the lower part of the absorber showing the relative arrangements of its various elements.

This method of making a fluid tight joint at the edge of each floor facilitates greatly ease of assembly of the whole structure, as it eliminates the necessity of riveting or welding or in some other manner attaching the edge of each floor to shell 10 in such a manner as to make a fluid tight joint. Also the method of supporting the floors lends itself readily to ease of manufacture and assembly. The packings at the edges of the floors are not depended upon to support the floors; the latter being supported upon a plurality of columns 20 that are set upon bottom 21 of the shell and extend upwardly through the various floors. The detailed structure of these columns is shown more particularly in Figs. 4, 5 and 6. The number of columns may be as desired, but I have shown seven—one central column and six evenly spaced around it. At the bottom 21 there are sockets 22 and in these sockets stand the lowermost sections 23 of the columns. All the sections of the columns may well be made of pipe. Thus this lowermost section 23 is a length of pipe long enough to reach to and slightly above the lowermost floor 11. Directly beneath the floor and acting as a direct support therefor is a nut 25. The upper end of lowermost section 23 projects somewhat above floor 11 and a pipe collar 26 is screwed down on the upper end of this section so as to hold floor 11 down against nut 25. Then the next upper section 27 of the column is threaded at its lower end into the collar 26; and this next upper section goes on to the next floor, which is supported in a similar manner; and so on the several columns are made up in sections until the uppermost floor is reached and supported.

The nuts 25 provide a good support for the floors, and at the same time provide an easy adjustment for leveling them. Once the nuts are set in proper position, collars 26 are screwed down tightly above a floor, holding the floor rigidly in place.

From what I have said regarding the support of the floors, the method of assembly will be more or less obvious. Lowermost column sections 23 are put in place with their nuts 25 and then the lowermost floor with its accompanying elements (hereinafter described) is put into place over and upon the columns; this floor is leveled and secured by placing the collars 26 and is packed at its peripheral edge as before described. Then the next sections of the several columns are put into place ready to take the next floor.

Each floor, as I have said, is formed of a perforated plate; and each floor carries a plurality of overflow pans 30 supported on nipples 31 that pass through the floor and extend to a point near the floor next below. Pans 30 are carried at a suitable height above their corresponding floors, the height depending somewhat upon various conditions, including the character or consistency of the absorbing liquid. It is the function of these pans to take overflow of the froth that forms over each floor, and their height may be somewhat varied in order to make them properly perform their functions. Nipples 31 may be supported in floors 11 by flange connections 32; and at their lower ends these nipples have spreader cones 33 that lie close to the floor below; the lower ends of the nipples being at points near enough the floor below that they are always submerged by the liquid or liquid and froth on that floor so as to prevent passage of gas directly up through the nipples. The nipples 31 of pans 30 associated with the lowermost floor 11, instead of having spreaders, have on their lower ends cups 34 forming liquid traps through which the gas cannot pass upwardly. By reference to Figs. 2 and 3 it will be seen that each floor carries a plurality of overflow pans 30 and that the arrangement on alternating floors is made so that the lower ends of nipples 31 from the floor above will not interfere with the pans 30 on the next floor below. The pans 30 are made of considerable area, and are preferably relatively shallow.

The absorbing liquid—in a typical case, a fairly heavy petroleum oil—is fed into the apparatus through pipe 35 and is distributed to the uppermost floor 11 by a perforated pipe 36. Flowing over this uppermost floor the liquid is prevented from flowing directly through the floor perforations by reason of the gas pressure beneath the floor. The gas is initially introduced at 37 below the lowermost floor 11 and at a point above the liquid outlet 38, so that gas is introduced above the liquid level standing in the bottom of the shell. The gas, under suitable pressure, passes upwardly through the perforations in the lowermost floor and bubbling up in finely divided streams, and therefore in fine bubbles through the liquid on that floor creates a considerable froth which stands on the surface of whatever solid liquid there may be present. This froth is constantly breaking up and releasing the gas into the space above, the gas being thus released to pass under the pressure through the next floor up. At each floor the same kind of action takes place until the gas passes through the uppermost floor, when it finally passes off through the gas outlet 39.

At each floor a mass of froth is formed; fine bubbles being formed by formation of a film of oil around each minute gas bubble. This finely divided froth blows up in each floor until it reaches a level of the upper edges of pans 30; and the uppermost part of the froth then overflows constantly into the pans. It is the uppermost parts of the froth in which the individual bubbles are breaking and releasing gas; therefore the froth in this uppermost part which flows over the edges of the pans and into the pans breaks up, releases the entrained gas, and, in the form of clear liquid, flows from the pans through nipples 31 and thus down onto the next floor. As I have said before, the lower ends of nipples 31 are close enough to the next floor that the gas cannot flow upwardly through the nipples. The gas is thus constantly being bubbled in very fine division through the liquid at each floor, a fine froth is constantly being formed, giving extremely intimate contact between the liquid and gas or vapor and the froth is constantly breaking up and the resultant liquid from the broken up froth is constantly flowing from one floor to the next. While the liquid is thus slowly flowing downwardly through the apertures the gas is passing upwardly through it. The capacity of the apparatus is governed mainly by its area in plan; the length of time during which the gas or vapor is in intimate contact with the liquid—and therefore the thoroughness with which absorption or other interchange between the gas and liquid takes place—is governed at least in part by the number of superimposed floors in the apparatus. However, it will be understood that in a structure of given size, the gas or vapor is in my apparatus put into much more intimate contact and kept in that contact during a much longer time period than is true in ordinary forms of absorption apparatus.

From what I have said it will be apparent that my construction not only lends itself readily to easy and economical fabrication and assembly, but also lends itself readily to proper leveling of the several floors and their several overflow devices. It is, of course, apparent that in order to obtain uniformity of action the overflow edges of the several pans 30 above each floor should be as nearly on a level as may be. And it will be clear that, before the placement of each floor upon the supporting columns, the supporting nuts 25 under that floor are easily adjusted to bring that floor to a proper level. When the floors and their attached overflow pans have been fabricated it is, of course, easy to put the edge of each pan at a certain predetermined distance above the floor; or, putting the matter in another way, to place in a common plane the several edges of the pans attached to a floor. Thus the pan edges may be initially set in a common plane regardless of the fact that the floor may even be warped. Then, by proper adjustments of the supporting nuts 25, the plane of the upper overflow edges of the pans may easily be made horizontal.

And in making such adjustments of the floors to insure leveling of the pans, the fluid tight packings at the edges of the floor facilitate operations, because it is not necessary, when using these fluid tight packings, that the peripheral edges of the floor be joined to the shell along any particular or predetermined line.

I claim:

1. In a device of the character described, an exterior shell, and means for forming a fluid-tight joint between the shell and the edge of a floor embodying a rim on the floor inset from its edge, jacking above the floor edge between the rim and the shell, a packing follower strip adapted to be forced down on the packing, and a ring above the strip having means to engage the shell to hold it in place.

2. In a device of the character described, an exterior shell, a plurality of superimposed spaced floors in the shell packing around the floor edges frictionally engaging the interior of the shell and making a fluid tight joint with the shell around the edge of each floor, and means to support the floors embodying sectional columns each made up of sections each of which extends from one floor to and through the floor next above, each section being threaded adjacent its upper end, a floor-supporting nut threaded on a section below each floor, and a coupling threaded onto the upper end of each section, bearing down on a floor, and taking the lower end of the next upper column section.

3. In a device of the character described, an exterior shell, a plurality of superimposed spaced floors in the shell, supporting means for the floors embodying vertical columns, adjustable supporting members on each of the columns beneath each floor, whereby the support of each floor may be adjusted to bring each floor independently to level, and packing around the floor edges frictionally engaging the interior of the shell and making fluid tight joints with the shell around the edge of each floor.

In witness that I claim the foregoing I have hereunto subscribed my name this 10th day of July, 1925.

JULIAN A. CAMPBELL.